United States Patent [19]
Sanchez

[11] Patent Number: 5,245,864
[45] Date of Patent: Sep. 21, 1993

[54] PROFILOMETRY SCANNER MECHANISM

[76] Inventor: Luis R. Sanchez, 235 SW. LeJeune Rd., Miami, Fla. 33134

[21] Appl. No.: 725,853

[22] Filed: Jul. 3, 1991

[51] Int. Cl.$^5$ .................. G01B 5/20; G01B 11/24; G01B 21/20; G01B 21/30
[52] U.S. Cl. .................. 73/105; 33/552; 33/546; 33/554
[58] Field of Search .......... 73/105, 104, 865.8; 356/376; 33/546, 547, 552, 554

[56]        References Cited
       U.S. PATENT DOCUMENTS

| | | | |
|---|---|---|---|
| 2,775,039 | 12/1956 | Price | 33/552 |
| 2,835,983 | 5/1958 | Razdow | 33/552 |
| 2,854,756 | 10/1958 | Aller | 33/552 |
| 3,553,370 | 1/1971 | Rosenheck | 318/705 |
| 4,133,204 | 1/1979 | Mittleman | 73/105 |
| 4,758,093 | 7/1988 | Stern et al. | 359/18 X |

FOREIGN PATENT DOCUMENTS

| | | | |
|---|---|---|---|
| 200781 | 8/1967 | U.S.S.R. | 33/552 |
| 815463 | 3/1981 | U.S.S.R. | 33/552 |

OTHER PUBLICATIONS

Pratt and Whitney Sigmatic Multi-Dimension Gaging Machines (The Modern, Low-Cost Answer to Production Gaging Problems; pp. 1–12; published by Dec. 1958 (8-55-5C Circular No. 592).

*Primary Examiner*—Tom Noland
*Attorney, Agent, or Firm*—J. Sanchelima

[57]        ABSTRACT

A mechanism for scanning the contour of a tri-dimensional body including control circuitry for processing and storing the pattern data obtained. The contour pattern is measured by using contour follower members that radially slide between the two arms of a scan rotor assembly that is driven by a reference step motor. Coaxially aligned phase disks are rotably and slidably mounted over outer slots on the outer periphery of the arms and a linkage mechanism is pivotally mounted on one end to a predetermined point in the phase disk and the other end to the contour follower member. The phase disks are slowed down by frictional force applied to the phase disks and this slowing down force is overcome by the contour follower once it comes in contact with the reference body. The phase angle difference between the phase disks and the referenced step motor rotation is measured, processed and stored for subsequent pattern matching with the use of a microprocessor.

10 Claims, 4 Drawing Sheets

FIG - 1 -

PROFILOMETRY SCANNER MECHANISM

BACKGROUND OF THE INVENTION

1. Field of the Invention

The present invention relates to mechanisms for scanning tri-dimensional bodies, and more particularly, to those mechanisms that include the use of microcomputers to store the characteristics of the reference bodies.

2. Description of the Related Art

The need to secure entry to controlled areas, to have access to information or in any way validating the privileges of a user have been the object of the design of numerous ingenious devices in the past. The conventional key is one of them. However, none of these devices have utilized the characteristics of a tri-dimensional body regardless of what material is made out of. This is particularly important because it makes practically all such bodies compatible with this system, including unique parts of the human body such as fingers and toes. None of the devices and methods known to this date have this flexibility.

SUMMARY OF THE INVENTION

It is one of the main objects of the present invention to provide a mechanism that is capable of recognizing the tri-dimensional contour of a body, storing these characteristics in code and identifying the same body profile subsequently to validating it.

It is another object of the present invention to provide such a mechanism that can validate a body, under test and that is smart enough to allow for gradual changes of the body and for differences in the relative positioning of the body from validation to validation.

It is still another object of this invention to provide such a mechanism that will compute and store information that is a function of the dimensions and profile of a body being tested or validated.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitation thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
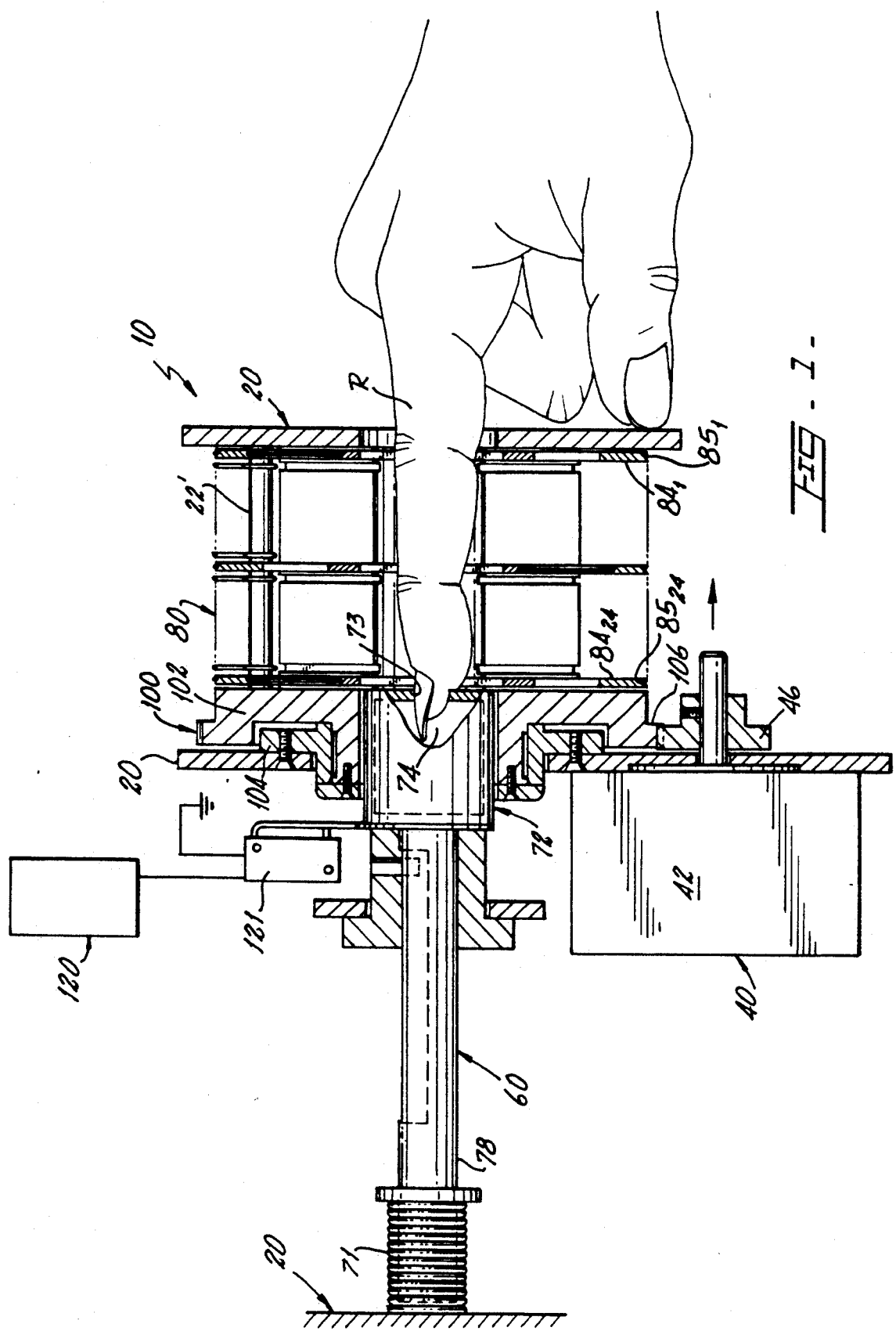
FIG. 1 is a partial cross-sectional view of the preferred embodiments of the present invention showing a user's finger being scanned.

Referring now to FIG. 1, where the present invention is generally referred to with numeral 10, it can be observed that it basically includes a housing assembly 20, step motor assembly 40, plunger assembly 60, phase disks assembly 80, scan rotor assembly 100, and control circuit assembly 120.

Housing assembly 20 includes, generally, all fixed parts shown in the drawings to which the other components are mounted.

Step motor assembly 40 includes a step motor device 42 that is preferably implemented with device model PH 264 M-32, manufactured by Vexta. However, any other equivalent step motor device that can preferably do 800 or more steps per revolution is suitable. Step motor assembly includes pinion gear 46.

Plunger assembly 60 has a substantially elongated shape and includes actuating end 72 and spring biased end 78 which includes spring 71. Actuating end 72 has a substantially cylindrical shape, in the preferred embodiment, defining compartment 74 into which a user's finger partially penetrates through cooperating cut-out 73, as best seen in FIGS. 1; 4 and 5. The purpose for cut-out 73 is to provide a relatively firm position where a user's finger tip can be placed to eliminate the length of the nail as a factor.

Figure 6:
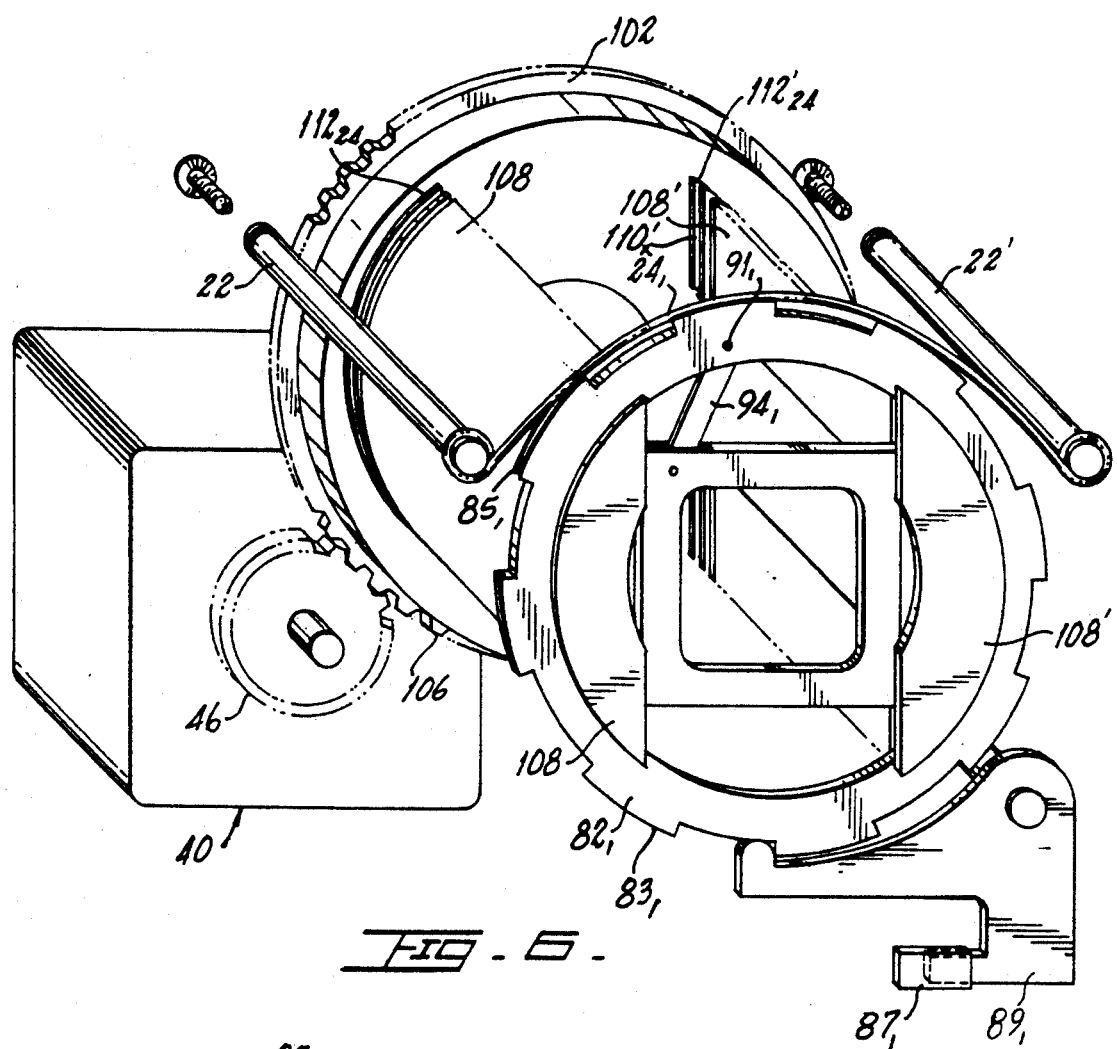
FIG. 6 is an isometric view of some of the components of the present invention to illustrate their functional interrelationship and wherein the size of the peripheral teeth of the phase disk $82_1$ at the front has been exaggerated.

Phase disks assembly 80 includes, in the preferred embodiment, twenty four co-axially aligned disks $82_x$, (where "x" is any number from 1 to 24) and each disk $82_x$ includes central openings $84_x$, (openings $84_1$ through $84_{24}$), through which a reference body R is inserted, as seen in FIGS. 1 and 6. Each phase disk $82_x$ includes one contour follower assembly $90_x$, as best seen in FIG. 3, that includes a contour follower member $92_x$ that reciprocally moves radially across the diameter of each phase disk $82_x$. Each contour follower assembly $90_x$ includes linkage arm $94_x$, having two ends, that is pivotally mounted to phase disk $82_x$ at one end at $91_x$ and to contour follower member $92_x$ at the other end at $93_x$.

Figure 3A:
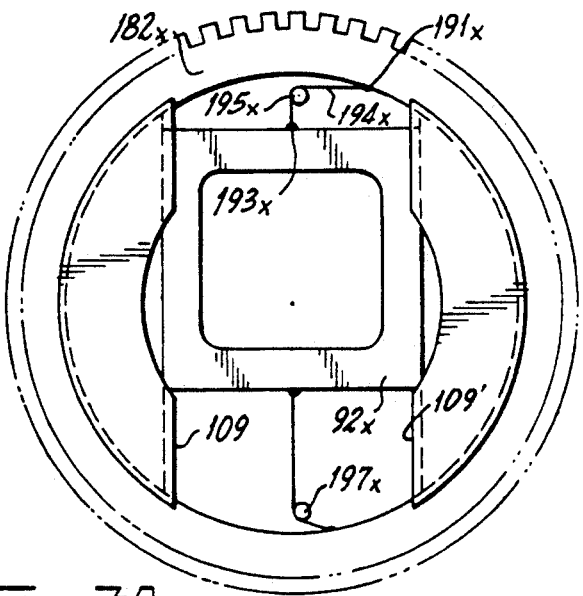
FIG. 3A is an alternate linkage mechanism to the one shown in FIG. 3.
Figure 3:
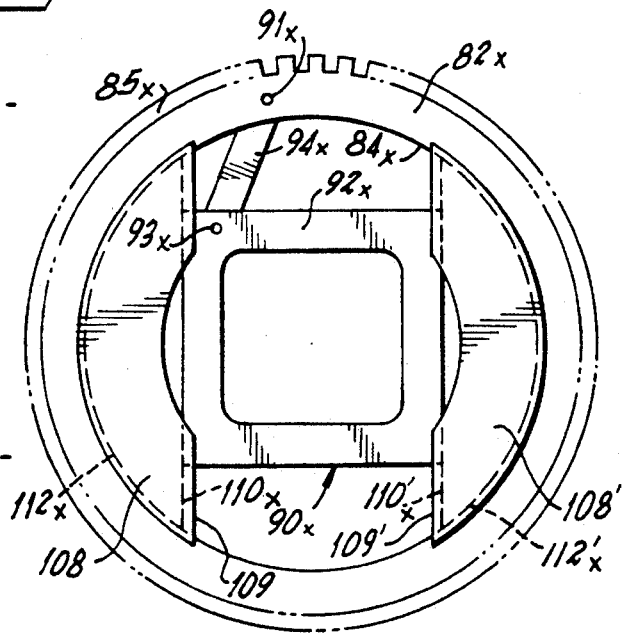
FIG. 3 illustrates one of the preferred embodiments in accordance with the present invention for the linkage mechanism between the phase disk and the contour follower member.
Figure 4:
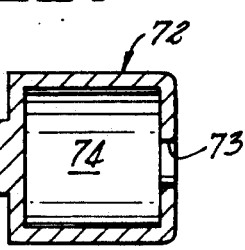
FIG. 4 represents a partial cross-sectional view of the actuating end of the plunger assembly.
Figure 5:
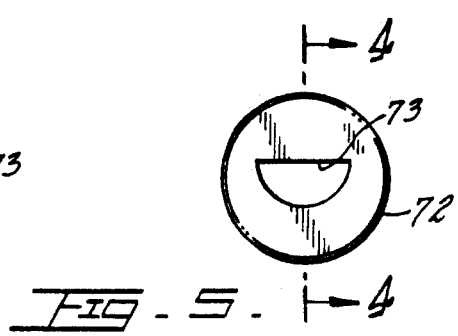
FIG. 5 is an end view of the actuating end of the plunger mechanism.
Figure 6A:
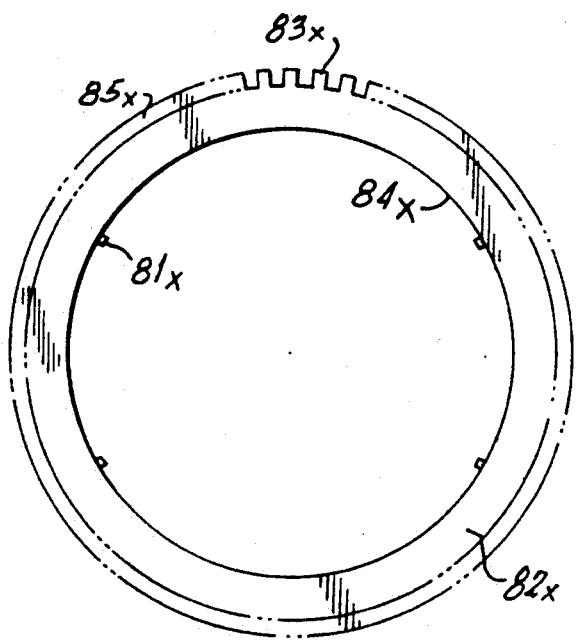
FIG. 6A shows a more realistic representation of the toothed phase disk (more teeth) thereby increasing the resolution of the device.

An alternate embodiment for the linkage mechanism is shown in FIG. 3A where steel wire $194_x$ is affixed to contour follower member $92_x$ at one point, such as $193_x$ and to phase disk $82_x$ at $191_x$. Diverters $195_x$ and $197_x$ direct the pulling force along the guided movement path of contour follower member $92_x$. As seen in FIG. 6, phase disks $82_1$ is represented with exaggerated teeth $83_1$. In reality, teeth $83_x$ will look like those shown in FIG. 6A. Actuator $89_1$ associated with phase disk $82_1$ detects the presence or absence of teeth $83_1$ and actuates electronic photointerrupter switch $87_1$.

Figure 6B:
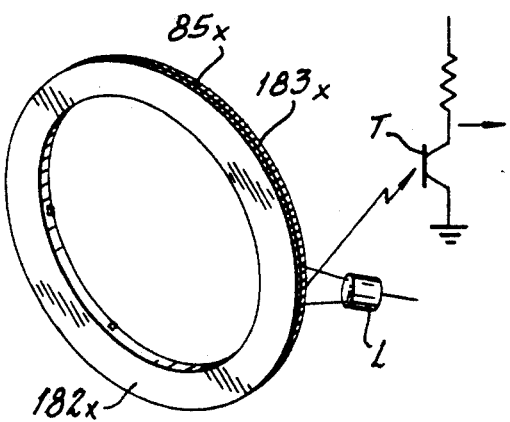
FIG. 6B represents an alternate embodiment where the toothed periphery of the phase represented in the previous figure is replaced with markings that are detectable through a phototransistor T with the application of suitable light source L.
Figure 7:
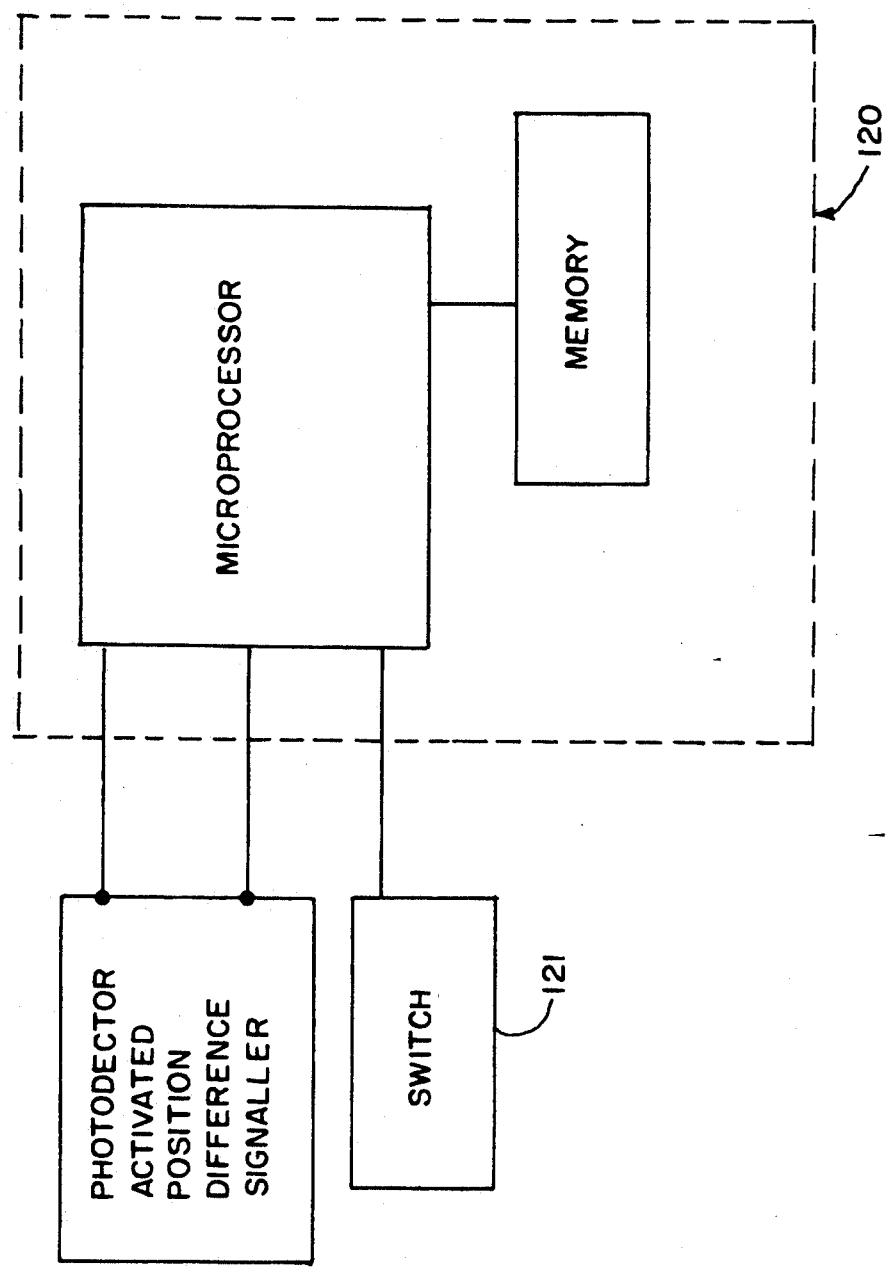
FIG. 7 represents a block diagram schematic of the control circuitry.

An alternate implementation for a mechanism to detect the relative position of phase disks is shown in FIG. 6B where an optical method is used. Light source L is bounced off marked surface $183_x$ on phase disk $182_x$ and detected by phototransistor T.

Scan rotor assembly 100 includes scan motor member 102 rotably mounted to housing 20 through bushing member 104 as seen in FIG. 1. Scan motor member 102 includes peripheral teeth 106 in meshed engagement with pinion gear member 46 as seen in FIG. 1 and 6. Scan rotor assembly 100 includes a pair of symmetric and opposed arms 108 and 108' that extend outwardly and perpendicularly to said scan motor member 102. Arms 108 and 108' have substantially the shape of a cylinder cut along its longitudinal axis. Arms 108 and 108' are disposed in parallel relationship with respect to each other, as best seen in FIGS. 3 and 6. Arms 108 and 108' have substantially flat and opposing surfaces 109 and 109' and these surfaces in turn include, in the preferred embodiment, twenty four parallel inner slots $110_x$ and $110'_x$ along which contour follower members $92_x$, in the preferred embodiment, are slidably mounted. Contour follower members $92_x$ are preferably of the same dimensions and therefore the spacing between corresponding inner slots $110_x$ and $110'_x$ is the same. Arms 108 and 108' include outer slots $112_x$ and $112'_x$ over which phase disks $82_x$ are rotably mounted, as shown in FIG. 6. Also, in FIG. 6A the periphery of openings $84_x$ may include nipple members $81_x$ in order to minimize friction.

Figure 2:
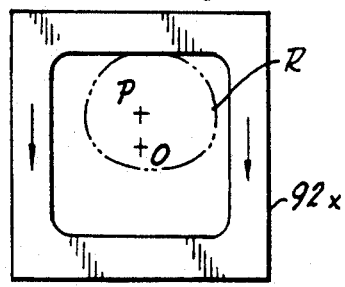
FIG. 2 shows a front view of one contour follower member travelling downwardly and being prevented from any further movement by reference body R.
Figure 2A:
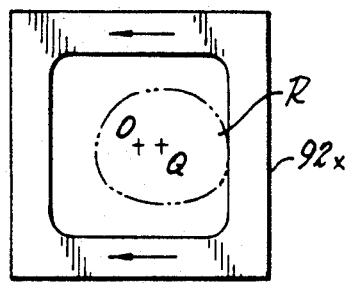
FIG. 2A shows the same contour follower described in FIG. 2 when it reaches the 90° position pressing from right to left.
Figure 2B:
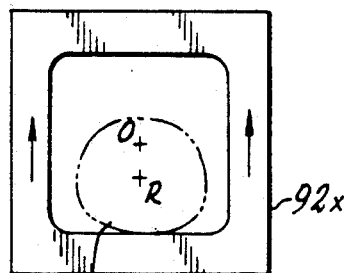
FIG. 2B shows the contour follower member represented in the previous two figures pressing now from the bottom up as the rotor reaches the 180° position.
Figure 2C:
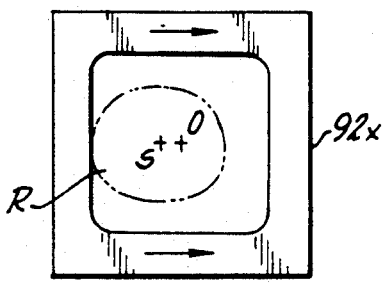
FIG. 2C shows the contour follower member in the 270° position.

Fixed rod members 22 and 22' are rigidly mounted to housing 20 and support wire members $24_x$, preferably made out of steel, that are attached to rod members 22 and 22'. In FIG. 6, wire member $24_1$ is shown which is associated with first phase disk $82_1$. Wire members $24_x$ come in contact with peripheral grooves $85_x$ on phase disks $82_x$ thereby slowing down through friction the rotation of the latter, as best seen in FIG. 6. The rotational speed of scan rotor member 102, however, is not affected. The slowing down of a given phase disk $82_x$ with respect to arms 108 and 108' causes its corresponding contour follower member $92_x$ to slide radially away from point $91_x$. This movement of contour follower member $92_x$ stops when reference body R makes contact with member $92_x$, as shown in phantom in FIGS. 2; 2A; 2B and 2C. Linkage arms $94_x$ rotate to a certain angle to permit member $92_x$ to slide until said contact occurs. Once contact is made, the friction created by spring wire member $24_x$ is overcome and phase disk $82_x$ stops changing phase (relative position) with respect to arms 108 and 108' of scan motor assembly 100. It is this phase or angular difference between predetermined points at arms 108 and 108' and phase disk $82_x$ what is measured and provides a proportional indication of the displacement of contour follower $92_x$ from the axial center of the scan rotor assembly 100 at a predetermined plurality of circumferential locations of body R. This displacement is identified as the distance difference between the center of contour follower member $92_x$ at rest or point "O" and the center points of members $92_x$ when they make contact with body R which are identified as points P; Q; R and S for 0°; 90°; 180° and 270°, respectively. It is to be understood that in the preferred embodiment step motor assembly 40 will provide a total of 3200 reference positions to the scan rotor. Therefore, there is an angular difference of 360°/3200 or 6.75 arc minutes per step.

A profile detected for a particular body being validated (such as a finger) is compared with the reference. Absolute values are not important but the relative differences of displacement of the contour followers (which are proportional to the angular differences between the phase disks and the rotor arm members) are and they provide a characteristic pattern or profile for each body being tested. Therefore, the profiles detected can then be compared against stored profiles to determine whether they match.

It has been found that with twenty four phase disks $82_x$ and their respective contour follower members $92_x$, an accurate profile of a given reference body can be obtained. This profile is computed and stored as a pattern for its subsequent identification. The absolute travel of contour follower members $92_x$ and the relative variations along the entire set of phase disks $82_x$ around the periphery of body R is what determines whether a positive identification has been made. Several patterns can be stored in control circuit assembly 120 which includes a microprocessor and storage circuit for storing the pattern data for one or more reference bodies R. Switch assembly 121 selectively makes or disconnects control circuit assembly 120, thereby providing a signal to the computer that the finger is in position for validation.

It is understood that when reference body R is taken out of mechanism 10, the contour followers retract away from body R. The phase disks will then go back in alignment (to its reset position).

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A mechanism for scanning a tri-dimensional body comprising:
   A. housing means;
   B. scan rotor means rotatably mounted to said housing means, and said scan rotor means including a scan rotor member and step motor means for driving said scan rotor member and said scan rotor member further including two parallel spaced apart arm means rigidly mounted to said scan rotor member;
   C. a plurality of phase disk means rotatably and slidably mounted over said two arm means and coaxially disposed with respect to each other;
   D. a respective plurality of contour follower means slidably mounted within said two arm means;
   E. a respective plurality of linkage means for transmitting the motion of said phase disk means to said contour follower means; and
   G. means for detecting the angular position difference of each one of said phase disk means with respect to the position of said two arm means and said difference being proportional to the displacement of the associated contour follower means with respect to a center of said arm means.

2. The mechanism set forth in claim 1 further including:

H. circuit means for processing, storing and identifying said angular position differences between said each one of said phase disk means and said arm means and further including means for comparing and storing said differences as a profile specific to said body being scanned.

3. The mechanism set forth in claim 2 wherein each of said linkage means includes an elongated linkage arm having two ends and one of said ends being pivotally mounted to one of said respective and cooperating phase disk means and the other end being pivotally mounted to said contour follower means.

4. The mechanism set forth in claim 3 wherein said circuit means includes microprocessor means for computing and processing said detected differences and further includes memory means for storing instructions for said processing and data corresponding to reference pre-stored profiles against which said detected differences are compared.

5. The mechanism set forth in claim 4 wherein said arm means substantially have a shape of a longitudinally cut cylinder and further including a plurality of outer and inner grooves that cooperatively correspond to said phase disk means and said contour follower means, respectively, that are rotatably and slidably mounted thereon.

6. The mechanism set forth in claim 5 wherein said housing means includes plunger assembly means for receiving a distal end of the body being tested and said mechanism further including switch means for selectively activating and deactivating said circuit means.

7. The mechanism set forth in claim 2 wherein each of said linkage means includes two wire means, each wire means having two ends, and one of said ends of said wire means being rigidly attached to the ends along the movement path of said contour follower means so that a pulling force can be applied by one of said two wire means as the respective phase disk means rotate with respect to said two arm means of said scan rotor means.

8. The mechanism set forth in claim 7 wherein said circuit means includes microprocessor means for computing and processing said detected differences and further includes memory means for storing instructions for said processing and data corresponding to reference pre-stored profiles against which said detected differences are compared.

9. The mechanism set forth in claim 8 wherein said arm means have substantially the shape of a longitudinally cut cylinder and further including a plurality of outer and inner grooves that cooperatively correspond to said plurality of phase disk means and contour follower means, respectively, that are rotably and slidably mounted thereon.

10. The mechanism set forth in claim 9 wherein said housing means includes plunger assembly means for receiving the distal end of the body being tested and said mechanism further including switch means for selectively activating and deactivating said circuit means.

* * * * *